UNITED STATES PATENT OFFICE.

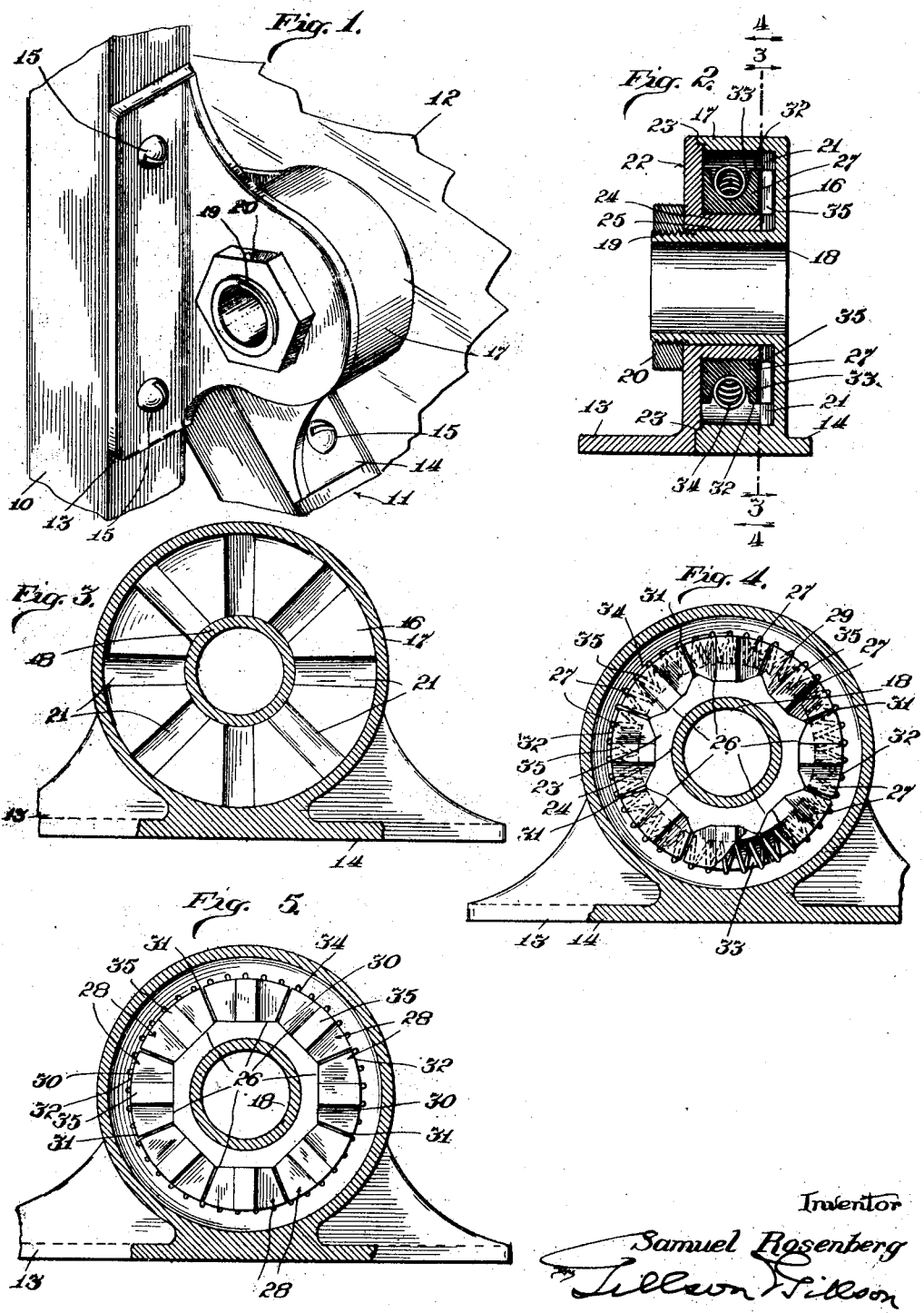

SAMUEL ROSENBERG, OF CHICAGO, ILLINOIS; DORA ROSENBERG ADMINISTRATRIX OF SAID SAMUEL ROSENBERG, DECEASED.

WINDSHIELD-HINGE.

1,348,376.  Specification of Letters Patent.  Patented Aug. 3, 1920.

Application filed June 14, 1919. Serial No. 304,142.

*To all whom it may concern:*

Be it known that I, SAMUEL ROSENBERG, a citizen of the United States, and resident of Chicago, county of Cook, and State of Illinois, have invented certain new and useful Improvements in Windshield-Hinges, of which the following is a specification, and which are illustrated in the accompanying drawings, forming a part thereof.
The object of the invention is the provision of a hinge for automobile wind shields that holds a swinging portion of a shield motionless in adjusted position.

In the accompanying drawings;
Figure 1 is a detail perspective view of a portion of a post supporting a wind shield, showing the hinge and the shield in partially open position;

Fig. 2 is a vertical section through the center of the hinge;

Fig. 3 is a detail section on the line 3—3 of Fig. 2 looking toward the right of said figure;

Fig. 4 is a section on the same line looking toward the left;

Fig. 5 is a section corresponding to Fig. 4, illustrating a modification.

The hinge shown as an embodiment of the invention for purposes of illustration is designed to be attached to the outside of the wind shield support, as post 10, and to the outside of the wind shield frame, as 11. The glass of the shield is indicated at 12. For attachment to these parts the hinge is shown as provided with base plates, as 13 and 14, which may be screwed or bolted to the shield and post, as indicated at 15.

A disk-like member 16 is shown as projecting from base 14, with a rim 17 extending toward the other member of the hinge thus forming a drum for inclosure of working parts. A pivot 18, shown as projecting within the drum and toward the other part of the hinge, is carried by the central portion of disk 16, about which pivot the other side of the hinge turns. This pivot is shown as tubular and as threaded at 19 for reception of nut 20 to hold the two parts of the hinge together. Radially extending channels, as 21, slightly wider at their outer ends, are shown on the inner surface of disk 16 for a purpose to be explained.

Extending from base 13 a disk 22, corresponding to member 16, is shown, bearing a shoulder, as 23, on its edge which fits with a like shoulder on rim 17 to form a tight joint. Integral with disk 22 is shown a polygonal projection 24, having an opening 25 through its center within which the pivot 18 journals. The sides of the polygonal projection may be substantially concave, as shown in Fig. 4, or plane, as shown at 26 (Fig. 5). The concavity of sides, as illustrated in Fig. 4, is formed of straight or plane central portions and projecting angles, for convenience of manufacture.

A series of elements 27, in Fig. 4, and 28, in Fig. 5, is shown, the assembled series encircling the polygonal projection. Each element 27 or 28 is shown as having an inwardly directed face 29 or 30, corresponding in shape and size with one side of the polygon comprising the exterior of projection 24. The sides 31 of each element substantially coincide with the radii passing through the angles terminating at one side of the polygon, and the exterior side 32 forms an arc of a circle intercepted by sides 31. A groove, as 33, is shown and is formed in the side 32 of each element 27 or 28 in such a manner that a continuous groove will be provided when the series of elements 27 or 28 is assembled. A coiled spring 34 is laid in groove 33 under tension, and has its ends fastened together or each fastened to the same element 27 or 28.

The action of the spring 34 placed under slight initial tension will be to yieldingly press the elements 27 or 28 against the sides of the polygonal projection. Each element 27 or 28 is made slightly smaller in circumferential extent than the distance between the radii above referred to in order that the faces 29 or 30 may be pressed against the sides of the polygonal projection and leave a slight clearance between adjacent elements. The purpose of this is to avoid rattling of the series of elements 27 or 28 as a whole against projection 24.

A rib 35 projects from the exposed face of each element 27 or 28, and when the parts are assembled each lug lies in a channel 21 in disk 16, whereby the series of elements is prevented from a motion of rotation relative to disk 16.

Operation: The pressure of elements 27 or 28 against the polygonal projection 24 integral with disk 22, and the engagement of lugs 35 with the channels in disk 16, will prevent undesired movement between the two sides of the hinge. When it is desired to change the angular position of the wind shield, pressure is applied thereto, causing relative motion of rotation between the projection 24 and the series of elements 27 or 28. The angles of the polygon will force elements 27 or 28 radially outward against the resistance of spring 34, lugs 35 sliding in the channels. The channels being slightly wider toward their outer extremities will avoid binding of the lugs therein. The wind shield may be adjusted to and will remain in any position with inner faces 29 of elements 27 or 28 in contact with the sides of the polygon. The form of polygon illustrated in Fig. 4 will offer more resistance to movement than that of Fig. 5, and would be used on heavier wind shields, or on smaller polygons where, the sides being shorter, less leverage exists to prevent motion.

I claim as my invention:

1. A wind shield hinge comprising two hinge parts pivoted together, a polygonal member secured to one part of the hinge, a series of elements resiliently held in contact with the sides of said member, and means carried by the other part of the hinge to prevent relative rotative movement between the same and said elements.

2. A wind shield hinge comprising a hinge member, a polygonal projection thereon, a series of elements resiliently held against the sides of the polygon, a second hinge member pivotally connected to the projection, and means preventing relative rotation between said elements and said second member.

3. A wind shield hinge comprising a hinge member having a polygonal projection, a series of elements coacting with the sides of said projection, a resilient member surrounding the series and yieldingly holding the elements against said sides, a second hinge member having means to prevent relative motion of rotation between itself and the series but to permit radial movement of the elements.

4. A wind shield hinge comprising a hinge member having a polygonal projection and an opening in the center of said projection, a series of elements corresponding in number with the sides of the polygon, the assembled series comprising an annulus adapted to encircle the projection, each of said elements having an inwardly directed face corresponding with a side of the polygon and a lug projecting from a side thereof, an expansible spring encircling the series, a second hinge member having a post adapted to journal within said opening, and a series of channels adapted to receive said lugs and prevent movement of rotation between itself and the series of elements but to permit radial movement of the elements.

5. A wind shield hinge comprising a hinge member having a polygonal projection, the sides of the polygon being slightly concave, and an opening in the center of said projection, a series of elements corresponding in number with the sides of the polygon, the assembled series comprising an annulus adapted to encircle the projection, each of said elements having an inwardly directed face corresponding with a side of the polygon and a lug projecting from a side thereof, an expansible spring encircling the series, a second hinge member having a post adapted to journal within said opening, and a series of channels adapted to receive said lugs and prevent movement of rotation between itself and the series of elements but to permit radial movement of the elements.

6. In a hinge, in combination, two hinge parts pivoted together, a drum carried by one of said parts, a polygonal member carried by one of said hinge parts and located in the drum, and means located in the drum acting on the faces of the polygon to offer resistance to movement of said hinge parts relative to each other.

7. A hinge comprising, in combination, a pair of attachment bases, a plate projecting from each base, said plates parallel to each other, a pivot extending between said plates, a series of surfaces carried by each plate for motion of rotation therewith, the surfaces of each series lying at an angle to the adjoining surfaces of the same series and being complemental to the surfaces of the other series, and means for resiliently pressing said complemental surfaces together whereby resistance is offered to relative motion between the hinge parts.

SAMUEL ROSENBERG.